United States Patent [19]

Weadon et al.

[11] Patent Number: 5,956,398
[45] Date of Patent: Sep. 21, 1999

[54] TELEPHONE SWITCHING MECHANISM

[75] Inventors: Mark William Weadon, Apex; Scott Yoder, Holly Springs, both of N.C.

[73] Assignee: Ericsson Inc., Research Triangle Park, N.C.

[21] Appl. No.: 08/893,816

[22] Filed: Jul. 11, 1997

[51] Int. Cl.⁶ ................................................... H04Q 7/32
[52] U.S. Cl. .................... 379/433; 379/428; 379/440; 455/575; 455/90
[58] Field of Search ............................. 455/575, 90, 403, 455/550, 425, 572; 379/433, 428, 440

[56] References Cited

U.S. PATENT DOCUMENTS

| | | | |
|---|---|---|---|
| 4,066,857 | 1/1978 | Suska | 700/61.7 |
| 4,845,772 | 7/1989 | Metroka et al. | 379/61 |
| 4,897,873 | 1/1990 | Beutler et al. | 379/433 |
| 5,117,073 | 5/1992 | Mischenko | 379/433 |
| 5,175,759 | 12/1992 | Metroka et al. | 379/433 |
| 5,274,882 | 1/1994 | Persson | 16/257 |
| 5,615,259 | 3/1997 | Gilbert | 379/433 |
| 5,832,080 | 11/1998 | Beutler et al. | 379/433 |
| 5,848,152 | 12/1998 | Slipy et al. | 379/433 |

*Primary Examiner*—Wellington Chin
*Assistant Examiner*—Keith Ferguson
*Attorney, Agent, or Firm*—Jenkens & Gilchrist, P.C.

[57] ABSTRACT

An electromechanical circuit uses a plunger to open and close a circuit as an indication of the position of a flip portion of a mobile communication device. The plunger includes an electrically conductive portion which slidingly contacts a contact pad. Upon contacting the contact pad, a change in logic states occurs which triggers circuitry to activate or de-activate the internal electronics within the communication device. This allows a user, for example, to activate a phone to receive a call without having to depress a specified switch. A common cam-follower mechanical configuration is used to cause the plunger to translate axially as the flip portion is moved.

7 Claims, 3 Drawing Sheets

TELEPHONE SWITCHING MECHANISM

BACKGROUND OF THE INVENTION

1. Technical Field of the Invention

This invention relates generally to portable communication devices and, more particularly, to portable radio telephones which utilize a hinged flip portion to allow access to the keypad of the phone.

2. Description of Related Art

Telephones having rotary or push button dial mechanisms and other buttons integral to the handset portion have become commonplace in landline subscriber stations. This arrangement offers the telephone user the convenience of bringing the user interface mechanism and control buttons close to the user.

Cellular communication devices, and cordless telephone sets, provide user mobility not offered by conventional landline telephones. The lack of the cord and the small size of the portable cellular communication device enables the user to simultaneously carry and use the unit. Such portability, however, typically requires additional action by the user to activate the telephone. For example, a landline phone is merely activated by lifting a handset off a phone base. Portable phones, including cellular and cordless phones, typically include a dedicated push-button switch which must be depressed to activate the phone. Thus, the user must depress a dedicated push-button switch before dialing a phone number or to answering a call. On other phones, and more commonly on cellular phones, the depression of any key on the keypad, or at least of any numerical key on the keypad, serves to activate the phone when a call is being received. In both cases, however, a user must hold the phone, examine the selection of keys, depress a key, and then move the phone into a communication position to activate the phone.

Some portable phone manufacturers, and especially phone cellular manufacturers, utilize what is commonly known as the "flip phone". The flip phone includes a hinged portion which acts as a cover for the cellular phone keypad whenever the hinged portion is in a closed position. To use a flip phone, a user usually must rotate the hinged portion from a closed position to a predetermined open position before receiving a call. Additionally, the user must depress a specified push-button switch or, at least, any key on the keypad to activate the phone. Thus, for a flip phone, a user must engage in a sequence of actions while the call is being received, to activate the phone, to actually take the call. The requisite switch action to activate the phone and connect the user to the call being received is substantial as compared to conventional landline phones. With landline phones, the phone is activated simply by lifting the handset off a dedicated switch. Lifting the handset activates the landline phone and connects the user to the caller. It is desirable, therefore, to simplify the user steps for activating a flip phone either whenever a call is being received or when the user desires to place a call. It would also be desirable to utilize simple and reliable circuitry in accomplishing this goal.

SUMMARY OF THE INVENTION

A cellular communication device, namely a flip phone, includes a switch for activating the phone automatically whenever a hinged portion is moved from a closed position to an open position. More specifically, rotating the hinged portion axially urges a plunger with a conductive portion toward or away from an electrically conductive contact pad. In one embodiment, an electrically conductive resilient member is used to form a circuit path. More specifically, the contact between the resilient member and the axially movable plunger completes an electrical circuit which causes a signal to be produced which is used by the telephone electronics to activate the phone. In another embodiment, the moving plunger breaks a circuit thereby causing a specified signal to change states. This change in state is then used by the telephone electronics to activate the phone. For each embodiment of the invention, a circuit is either completed or broken as the electrically conductive portion of at least one plunger slidingly contacts or breaks contact with at least one electrically conductive contact pad. The completion or breaking of the circuit is used by phone circuitry to determine that a flip portion has been opened to a specified point thereby indicating that the phone circuitry should be activated so that a call may be answered or made.

BRIEF DESCRIPTION OF THE DRAWINGS

A better understanding of the method and apparatus of the present invention may be obtained by reference to the following Detailed Description when taken with the accompanying Drawings wherein.

DETAILED DESCRIPTION OF THE DRAWINGS

Figure 1:
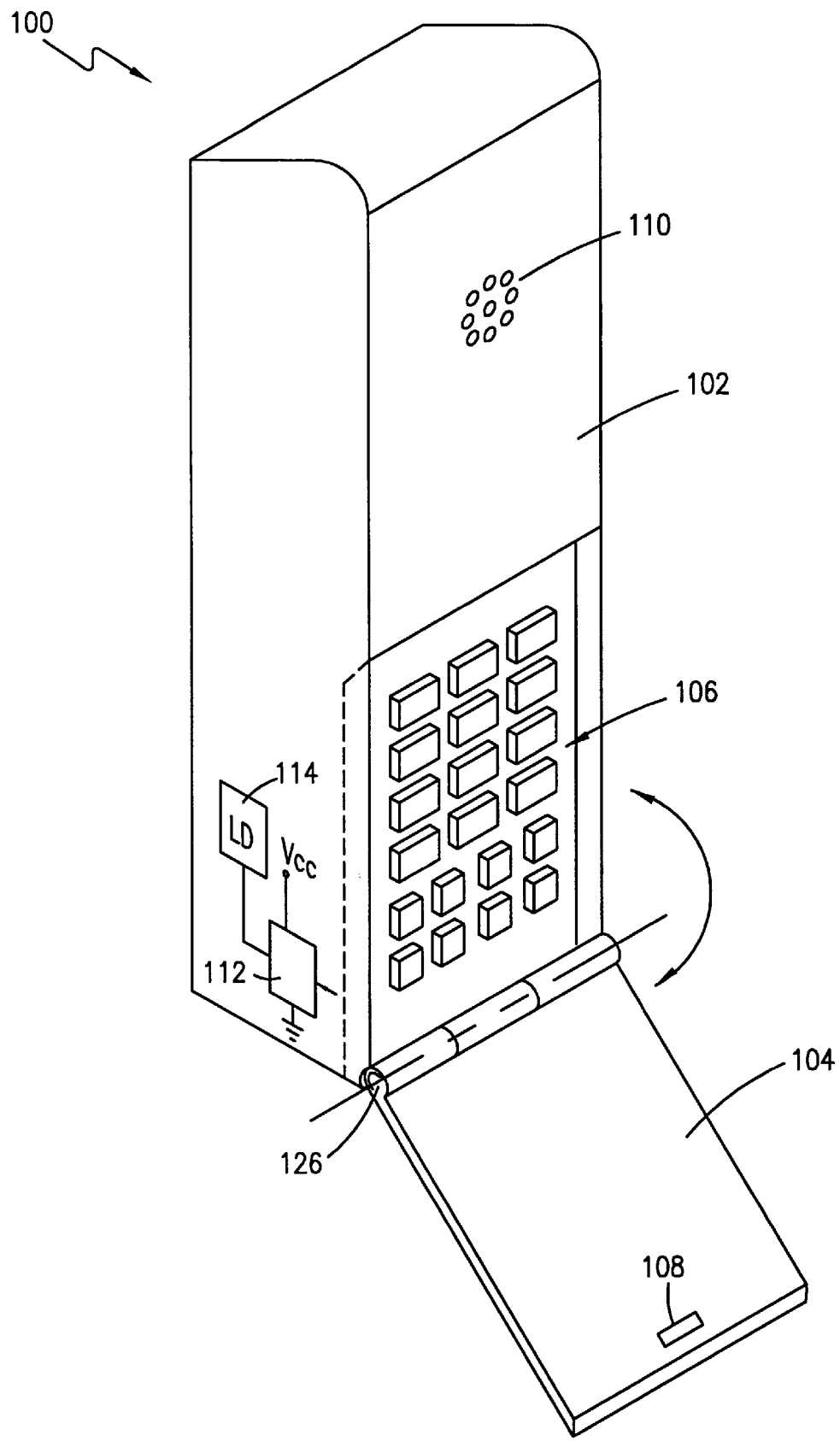
FIG. 1 is an isometric drawing of a mobile communication device which employs one embodiment of the present invention.

FIG. 1 is an isometric drawing of a mobile communication device which employs one embodiment of the present invention. Referring now to FIG. 1, a mobile communication device 100 includes a body 102 and a flip portion 104. The mobile communication device 100 may be either a cordless telephone for wireline networks, a cellular phone operable to communicate in a cellular network, a user terminal operable to communicate with a satellite, or any other form of a portable communication device.

As may be seen from FIG. 1, flip portion 104 is in an open position thereby exposing keypad 106. Flip portion 104 includes microphone hole 108 for allowing sound to pass through to a microphone embedded within flip portion 104 (not explicitly shown herein). As may be seen, therefore, the mobile communication device 100 is arranged in a state which renders it capable of operation. Continuing to refer to FIG. 1, body 102 includes a plurality of speaker holes 110 through which sound is transmitted from a speaker within body 102 (not explicitly shown herein). Mobile communication device 100 further includes a system 112 for automatically activating the mobile communication device 100 whenever flip portion 104 is moved into an open position as shown in FIG. 1.

In general, system 112 of the preferred embodiment is operable to open a closed circuit whenever flip portion 104 is moved from a closed position to a specified open position. In the preferred embodiment, logic device 114 within mobile communication device 100 is operable to activate the communication device 100 when a call is being received and when the flip portion 104 is moved from a closed position to an open position. In other embodiments, communication device 100 is activated whenever flip portion 104 is moved into an open position regardless of whether a call is being received. In yet another embodiment, opening flip portion 104 causes a circuit to be closed instead of opened whenever the flip portion 104 is opened. Whether a circuit is closed or opened to indicate that the flip phone has been opened to a specified position, however, is a matter of design logic. It is the change in logic state that prompts the logic circuitry 114 to activate mobile communication device 100.

Figure 2:
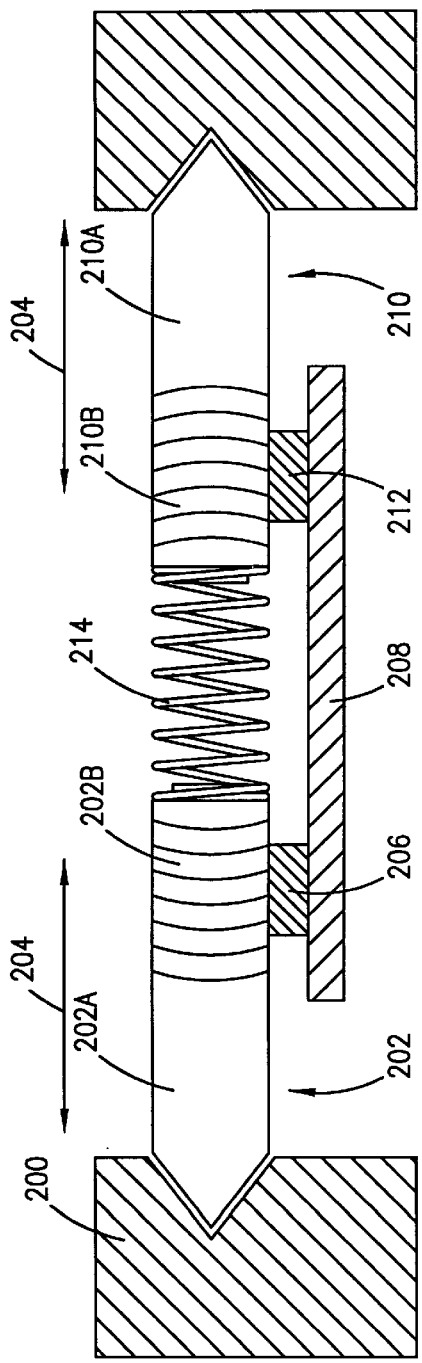
FIG. 2 is a cutaway view of a pair of translating plungers which are used to connect a circuit to indicate that the flip portion has been opened according to a preferred embodiment of the invention.

FIG. 2 is a cutaway view of a pair of translating plungers which are used to connect a circuit to indicate that the flip portion has been opened to a specified position according to a preferred embodiment of the invention. Referring now to FIG. 2, there is shown one embodiment of the electromechanical components of system 112 of FIG. 1. More specifically, plunger 202 translates axially in directions 204 to electrically contact and to break electrical contact with contact pad 206 as flip 200 opens and closes. Contact pad 206 is formed upon printed circuit board 208. Plunger 202 includes a non-conducting portion 202A and a conducting portion 202B. It is conducting portion 202B which creates electrical contact and breaks electrical contact with contact pad 206 as plunger 202 translates axially. Any common cam-follower configuration may be used wherein movement of the flip portion 200 of the phone causes the plunger 202 to translate axially in direction 204. For example, U.S. Pat. No. 5,274,882 to Persson ("Persson") discloses a hinge mechanism which includes translating plungers in a cam-follower configuration. Persson is incorporated herein by reference for all purposes.

Continuing to examine the plunger 202 of FIG. 2, the actual configuration of non-conducting portion 202A and conducting portion 202B may be varied in many ways. In system 112, as shown in FIG. 2, conducting portion 202B is conductive on all surface points at one end of plunger 202. In a different embodiment, a conductive portion 202B is formed only on the area of plunger 202 which is designed to electrically contact the contact pad 206. While the preferred embodiment includes a non-conducting conducting portion 202A, the entire plunger is electrically conductive, thereby not including a nonconductive portion 202A, in an alternate embodiment.

Continuing to refer to FIG. 2, plunger 210 includes a non-conducting portion 210A and a conducting portion 210B. As with plunger 202, plunger 210 translates axially in directions 204 to electrically contact and to break electrical contact with contact pad 212 as the plunger 210 translates axially in directions 204 whenever flip portion 200 opens and closes. As may be seen, contact pad 212, similar to contact pad 206, is formed upon printed circuit board 208.

Continuing to refer to FIG. 2, an electrically conductive spring 214 is connected to conducting portion 202B at one end and to conducting portion 210B at an opposite end. Accordingly, as plungers 202 and 210 translate axially into electrical contact with contact pads 206 and 212, respectively, an electrical circuit is created from contact pad 206 to contact pad 212. Electrically conductive spring 214 is operable to urge plungers 202 and 210 axially and outwardly. Other configurations may be used in place of spring 214. By way of example a non-conductive spring may be used. For such an embodiment other means for completing a circuit is required. For one example, at least two electrical contact points on the contact pad may be used so that a circuit is either closed or opened as the plunger(s) translate(s) axially. For another alternative embodiment, a lead may be connected to the electrically conductive portion 202B to create a circuit whenever portion 202B contacts the contact pad 206.

Figure 3:
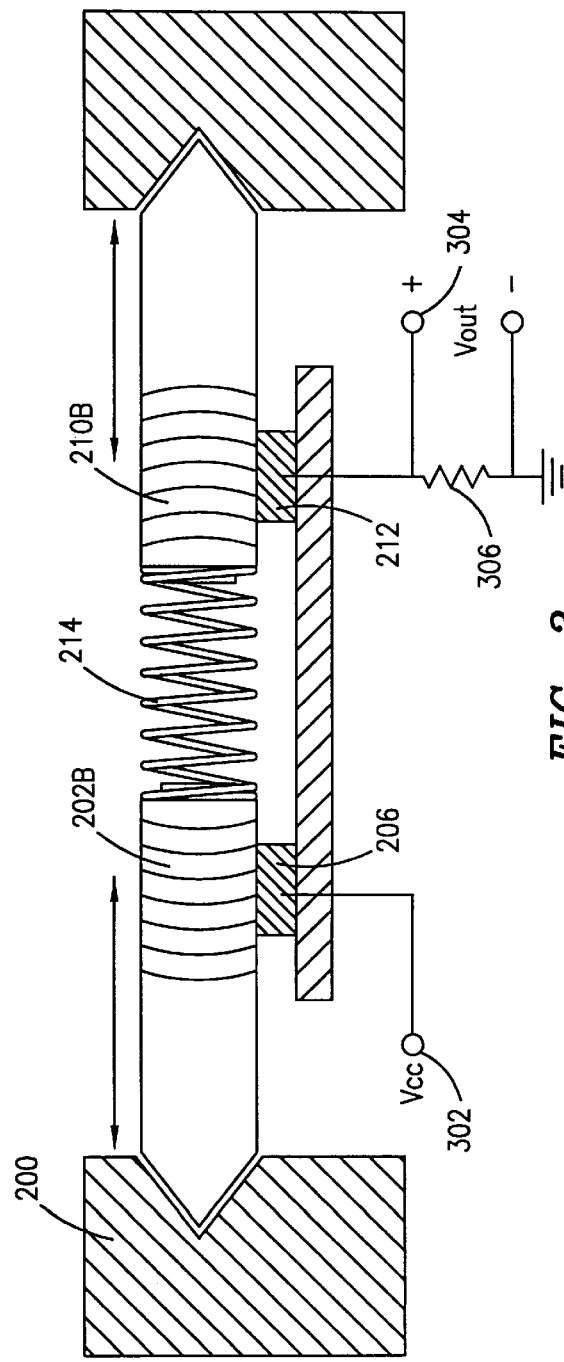
FIG. 3 is an electromechanical schematic illustrating a complete circuit according to the preferred embodiment of the invention.

FIG. 3 is an electromechanical schematic illustrating a complete circuit according to the preferred embodiment of the invention. Referring now to FIG. 3, a source voltage (VCC) is connected to node 302. Node 302, in turn, is connected to contact pad 206 of FIG. 2. Contact pad 212 of FIG. 2 is, in turn, connected to node 304. Contact pad 212 is also connected to load 306 which, in the preferred embodiment, is a resistor that is used to pull the logic signal "$V_{out}$" down to GND when VCC is not present. As may be seen, load 306 is also connected to ground in the preferred embodiment of FIG. 3.

In operation, when the plungers 202 and 210 translate axially to cause conductive portions 202B and 210B to electrically contact the contact pads 206 and 212, respectively, a circuit is formed from node 302 to node 304 and to ground through load 306. Accordingly, the source voltage VCC is dropped across load 306 which therefore allows an external voltage detector (not shown explicitly herein) to detect the voltage drop. The internal logic of the logic device 114 of FIG. 1 therefore can determine that the flip portion of the communication device has been moved into a specified state.

Figure 4:
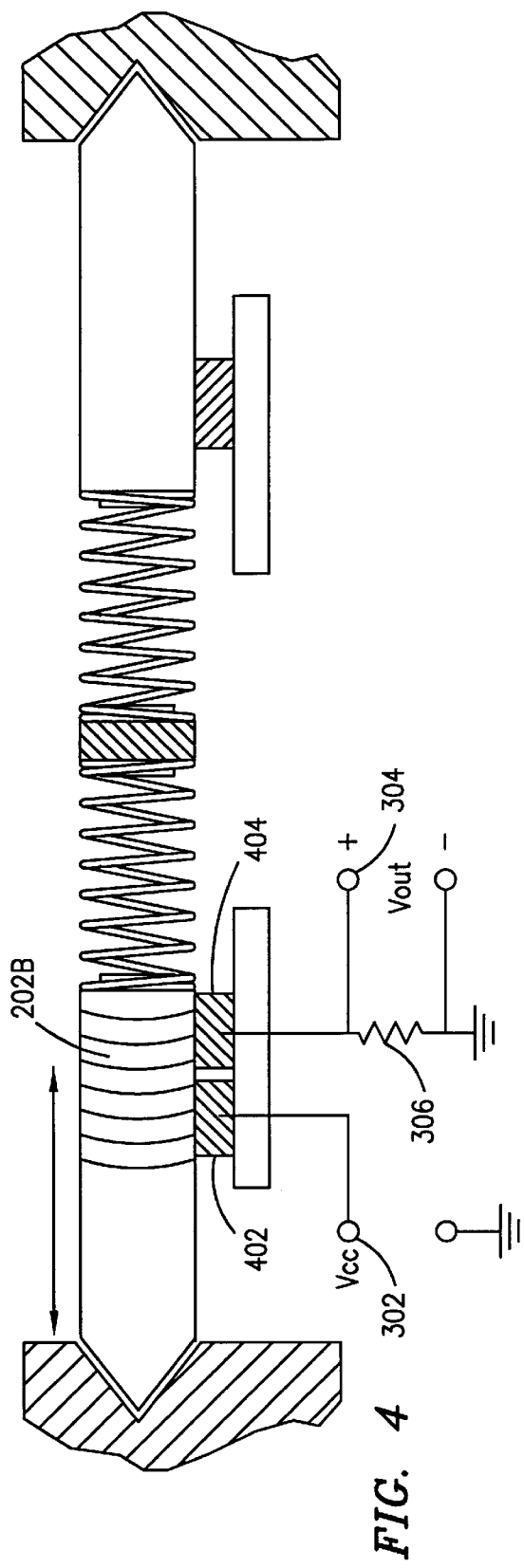
FIG. 4 is an electromechanical schematic illustrating a complete circuit according to a second embodiment of the invention.

FIG. 4 illustrates a second embodiment of the invention. Referring now to FIG. 4, only the translating plunger 202 includes an electrically conductive portion (here, portion 202B). A first contact pad 402 is connected to a second contact pad 404 whenever plunger 202 has translated into a position wherein conductive portion 202B is in electrical contact with the first contact pad 402 and with the second contact pad 404. Accordingly, a circuit is formed from VCC at node 302 through the contact pad 402, the electrically conductive portion 202B, the contact pad 404 and transfer the load 306 to ground. As before, the voltage drop across the load 306 is detected at the output node 304.

Figure 5:
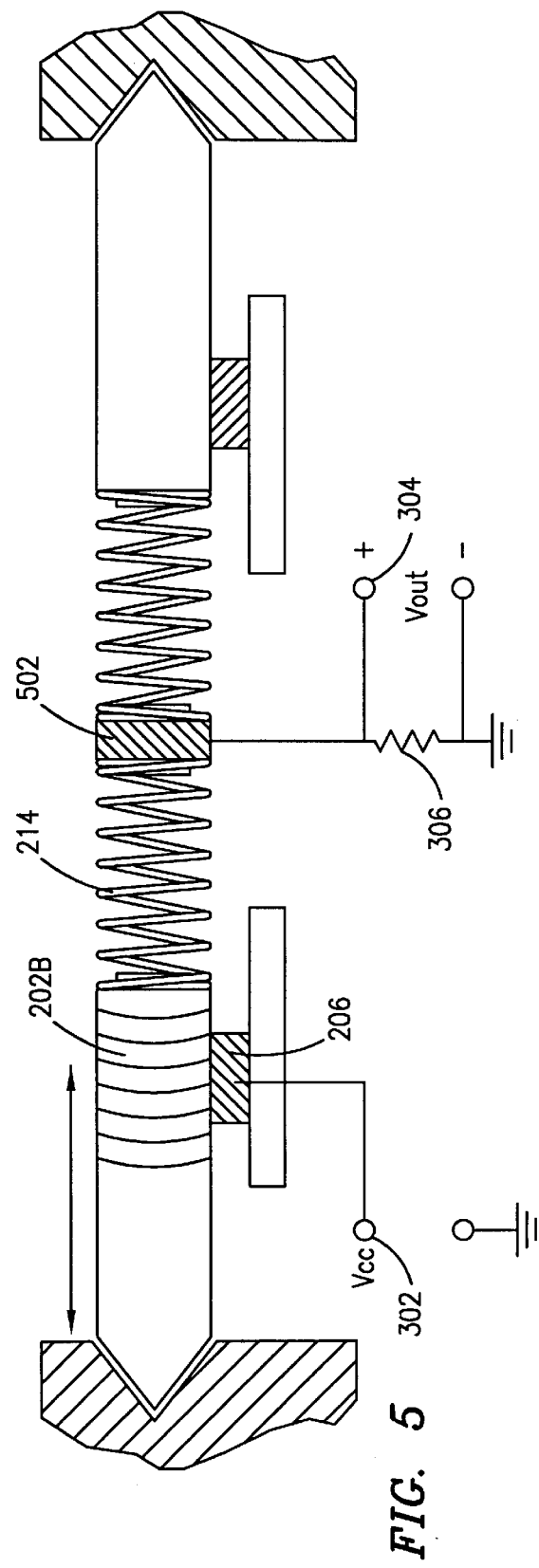
FIG. 5 is an electromechanical schematic illustrating a complete circuit according to a third embodiment of the invention.

FIG. 5 illustrates a third embodiment of the invention. Referring now to FIG. 5, as with the embodiment shown in FIG. 4, only one translating plunger 202 contains a conducting portion 202B which is used to create a circuit. In the embodiment of FIG. 5, however, an electrically conductive spring 214 is connected to plunger 202 at one end and to a rigid stop 402 at the other end. As may be seen, the rigid stop 502 includes an electrically conductive portion which is permanently connected to the node 304. In operation, it is only the movement of the plunger 202 which serves to electrically connect or disconnect the source voltage VCC to the load 306 to create a voltage drop at the node 304.

Although an embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. Electro-mechanical circuitry within a communication device connected to a voltage source at an input end and to an output, the circuitry for detecting whether a flip portion of the communication device has been moved into a predetermined position, comprising:

a contact pad formed upon a structure, the contact pad being electrically connected to the voltage source;

a plunger having an electrically conductive portion formed thereon for translating axially into and out of electrical contact with the contact pad according to flip portion position, the plunger being mechanically coupled to the flip portion;

an electrically conductive biasing means connected at a first end to the conductive portion;

a rigid and electrically conductive support connected to a second end of the biasing means; and a load having a first and a second end, the first end connected to ground and the second end electrically connected to the electrically conductive support and to the output.

2. The electromechanical circuitry of claim 1 wherein the plunger is mechanically coupled to the flip portion so as to close the circuit whenever the flip portion reaches a specified open position.

3. The electromechanical circuitry of claim 1 wherein the plunger is mechanically coupled to the flip portion so as to open the circuit whenever the flip portion reaches a specified open position.

4. Electro-mechanical circuitry within a communication device, the circuitry connected to a voltage source at an input end and to an output, the circuitry for detecting whether a flip portion of the communication device has been moved into a predetermined position, comprising:

a first contact pad formed upon a structure, the contact pad being electrically connected to a voltage source;

a second contact pad formed upon the structure;

a first plunger having an electrically conductive portion formed thereon for translating axially into and out of electrical contact with the contact pad according to the flip portion position, the plunger being mechanically coupled to the flip portion;

a second plunger having an electrically conductive portion formed therein for translating axially into and out of electrical contact with the second contact pad, according to the flip portion position, the second plunger being mechanically coupled to the flip portion;

a biasing means for biasing the first and the second plungers axially and outwardly, relative to each other, the biasing means being connected at a first end to the first plunger and at a second end to the second plunger; and a load having a first and a second end, the first end connected to ground and a second end electrically connected to the electrically conductive portions of the first and second plungers and to the output, wherein the electrical circuit is formed whenever the electrically conductive portions of the first and second plungers translate axially into electrical contact with the first and second contact pads respectively thereby causing a voltage drop across the load and at the output.

5. The electromechanical circuitry of claim 4 wherein the biasing means is electrically conductive and wherein the electrically conductive biasing means is connected at the second end of the biasing means to an electrically conductive portion of the second plunger.

6. Electro-mechanical circuitry within a communication device connected to a voltage source at an input end and to an output, the circuitry for detecting whether a flip portion of the communicate device has been moved into a predetermined position, comprising:

a contact pad formed upon a substrate, the contact pad having first and second electrically conductive portions, which first and second electrically conductive portions are isolated relative to each other, the first portion being connected to a voltage source, and the second portion being electrically connected to an output;

a load connected between the output and ground;

a plunger having an electrically conductive portion formed thereon for translating axially into and out of electrical contact with the first and second portions of the contact pad according to flip portion position, the plunger being mechanically coupled to the flip portion; and biasing means mechanically coupled to the plunger to urge the plunger in a specified axial direction.

7. Electromechanical circuitry within a hinge of a flip portion of a communication device for detecting whether the flip portion of the communication device has moved into a predetermined position, comprising:

a contact point positioned on the communication device, the contact point including an input from a voltage source;

a plunger, having an electrically conductive portion positioned thereon, along an axis of the hinge for axial movement with respect to the axis of the hinge when moving the flip portion between first and second positions, the electrically conductive portion of the plunger translating axially into and out of electrical contact with the contact point in response to movement of the flip portion between the first and second positions;

means for biasing the plunger to the first position; and a load having a first end and a second end, the first end connected to ground and the second end electrically connected to the electrically conductive portion of the plunger, whenever the plunger translates axially into electrical contact with the contact point.

* * * * *